US012403782B2

(12) United States Patent
Thomason

(10) Patent No.: US 12,403,782 B2
(45) Date of Patent: Sep. 2, 2025

(54) POWER CHARGING SYSTEM AND CONTROL SYSTEM FOR TOWING VEHICLE AND TOWED VEHICLE CONNECTABLE TO TOWING VEHICLE

(71) Applicant: Dragonfly Energy Corp., Reno, NV (US)

(72) Inventor: William A. Thomason, Friday Harbor, WA (US)

(73) Assignee: Dragonfly Energy Corp., Reno, NV (US)

( * ) Notice: Subject to any disclaimer, the term of this patent is extended or adjusted under 35 U.S.C. 154(b) by 481 days.

(21) Appl. No.: 17/489,003

(22) Filed: Sep. 29, 2021

(65) Prior Publication Data

US 2023/0096878 A1    Mar. 30, 2023

(51) Int. Cl.
| | |
|---|---|
| *H02J 7/00* | (2006.01) |
| *B60L 53/16* | (2019.01) |
| *B60L 53/18* | (2019.01) |
| *B60L 53/53* | (2019.01) |
| *B60L 53/62* | (2019.01) |
| *B60P 3/12* | (2006.01) |
| *H02J 7/34* | (2006.01) |

(52) U.S. Cl.
CPC .............. *B60L 53/16* (2019.02); *B60L 53/18* (2019.02); *B60L 53/53* (2019.02); *B60L 53/62* (2019.02); *B60P 3/12* (2013.01); *H02J 7/342* (2020.01)

(58) Field of Classification Search
CPC .......... B60L 53/16; B60L 53/18; B60L 53/53; B60L 53/62; H02J 7/342; B60P 3/12
USPC .................................... 320/103, 109; 701/22
See application file for complete search history.

(56) References Cited

U.S. PATENT DOCUMENTS

| | | | |
|---|---|---|---|
| 4,025,861 A | 5/1977 | Godard et al. | |
| 5,055,656 A | 10/1991 | Farah et al. | |
| 9,242,570 B2 | 1/2016 | Kim et al. | |
| 9,566,854 B2 | 2/2017 | Kerschl et al. | |
| 10,661,663 B2 | 5/2020 | Zhang et al. | |
| 2004/0201365 A1* | 10/2004 | Dasgupta | B60L 58/20 |
| | | | 320/116 |

(Continued)

FOREIGN PATENT DOCUMENTS

| | | |
|---|---|---|
| GB | 2 416 631 A | 2/2006 |
| WO | 2017/135996 A1 | 8/2017 |

OTHER PUBLICATIONS

[No Author Listed] Euro Battery Connector. Anderson Power. https://www.andersonpower.com/us/en/resources/EBCResourcesPage.html. Publicly available at least as early as Aug. 9, 2021. 4 pages.

*Primary Examiner* — Zixuan Zhou
(74) *Attorney, Agent, or Firm* — Wolf, Greenfield & Sacks, P.C.

(57) ABSTRACT

A power charging system for a towing vehicle and towed vehicle combination for transferring high charging power from a charging device in the towing vehicle to an energy storage device on the towed vehicle. The power charging system is capable of safely transferring at least 1 kW of charging power. The power charging system includes a controller and sensors operably coupled to the controller via a communication system for safely powering the system when needed to charge the energy storage device, and safely de-powering the system prior to disconnecting the high-power charging circuit between the towing vehicle and the energy storage device.

65 Claims, 4 Drawing Sheets

(56) References Cited

U.S. PATENT DOCUMENTS

| | | | |
|---|---|---|---|
| 2005/0151513 A1* | 7/2005 | Cook | H02J 7/1423 320/137 |
| 2006/0028167 A1 | 2/2006 | Czubay et al. | |
| 2012/0029747 A1* | 2/2012 | Katoh | B60R 16/03 701/22 |
| 2013/0257144 A1* | 10/2013 | Caldeira | B60L 58/20 307/9.1 |
| 2015/0097526 A1* | 4/2015 | DeDona | B60L 53/16 320/109 |
| 2015/0343915 A1* | 12/2015 | Murakami | H01R 13/6395 307/130 |

* cited by examiner

POWER CHARGING SYSTEM AND CONTROL SYSTEM FOR TOWING VEHICLE AND TOWED VEHICLE CONNECTABLE TO TOWING VEHICLE

BACKGROUND

The field of the invention generally relates to power charging systems for charging an energy storage device, and more particularly, to power charging systems and methods for using a charging device in a towing vehicle to charge an energy storage device, such as a re-chargeable battery, in a towed vehicle connectable to the towing vehicle.

There are a number of examples of towed vehicles which are disconnectably coupled to a towing vehicle for supplying the primary motive power to transport the trailer. For example, in the trucking industry, tractor-trailer combinations are commonly used to transport cargo. The tractor (i.e., the "towing vehicle") part of the combination includes a motor for supplying the motive power, and the trailer (i.e., the "towed vehicle") is mechanically coupled to the tractor Similar towing-towed vehicle combinations include passenger vehicles ("towing vehicles"), such as automobiles and trucks, couplable to trailers, such as recreational vehicles (e.g., camper trailers, fifth wheelers, and the like) and moving trailers ("towed vehicles").

In each of these examples, the trailer may have a battery for powering various electrical devices and systems on the trailer, such as appliances like refrigerators, air conditioners, etc., when the towing vehicle's motor is not running or when the trailer is disconnected from the towing vehicle. Accordingly, the trailer may also be electrically coupled to the tractor using wires and/or cables to supply electrical power to subsystems and signals (e.g., turn signals, brake lights, etc.) on the trailer, and also to charge the trailer battery. Currently available power systems for such towing-towed vehicle combinations operate at 12 volts (12 V), which is a common standard for motor vehicles, or in more limited cases 24 V. For example, the power pins of towed vehicle common electrical plugs are able to carry at most 5-10 amps (5-10 A) of current. Accordingly, the electric power capability of the cabling, connectors and other circuitry are limited to relatively lower power levels in the range of 200 watts (200 W) to 400 watts (400 W) maximum. Moreover, current power systems for towing-towed vehicle combinations do not have the capability to fully sense the battery status, battery charging limitations or battery fault conditions. For example, many batteries, such as lithium-ion batteries (Li-Ion), have temperature limitations for charging and discharging, and can be damaged or even dangerous, if operated outside the correct parameters. Current power system typically only detect the battery voltage in controlling the battery charging status of the system.

In addition, with the advent of high energy batteries, such as large Li-Ion battery modules, there is a need for supplying much higher power from the towed vehicle to the towing vehicle to charge the batteries. Current power systems are not capable of safely transmitting high power (e.g., above 1 kW) from between the towing vehicle and the towed vehicle. For example, the sockets on the connectors (e.g., plugs) on current power systems for electrically connecting the towed vehicle to the towing vehicle are currently used at relatively low voltage and low power levels, so they are not secured. If operated at higher power levels, these connectors would present a safety and performance risk of exposed and live voltage/current pins when not connected.

SUMMARY

The presently disclosed inventions are directed to power systems for a towing vehicle and towed vehicle combination for transferring relatively high charging power from the towing vehicle to the towed vehicle to charge an energy storage device on the towed vehicle, which overcome the deficiencies of previously disclosed power systems, as described above. The towing vehicle may be any suitable vehicle including tractors, trucks, or automobiles, having a motive power source and a charging device. The towed vehicle may be any suitable trailer, including moving trailers, semi-trailers, truck trailers, camper trailers, fifth wheelers, and the like, and having an energy storage device, such as a chemical battery, Li-ion battery, capacitive storage device, solid state battery, or the like.

In one embodiment, a power charging system according to the present invention includes a charging device installed on the towing vehicle. For example, the charging device may be an alternator on the towing vehicle which is a generator driven by the engine of the towing vehicle, or a battery on the towing vehicle, or other device that generates electric power. A towing vehicle interface is disposed on towing vehicle and is in selectable electrical connection with the charging device. For example, the power charging system may include a towing vehicle disconnect, such as a switch or relay, for selectably connecting and disconnecting the electrical connection between the charging device and the towed vehicle interface. The towed vehicle interface may be any suitable electrical connector, plug, or the like.

The power charging system also includes an energy storage device installed on the towed vehicle. For example, the energy storage device may be a chemical battery, such as a lead acid battery, Li-ion battery, capacitive storage device, etc. The energy storage device is typically for powering devices like appliances, lighting, heating, ventilation and air conditioning (HVAC), and other electrical devices on the trailer. A towed vehicle interface is installed on the towed vehicle and is in selectable electrical connection with the energy storage device. For instance, a towed vehicle disconnect device, such as a switch or relay, may be used for connecting and disconnecting the electrical connection between the charging device and the towed vehicle interface. The towed vehicle interface is configured to be connected and disconnected with the towed vehicle interface and may be any suitable electrical connector, plug, or the like. The towed vehicle interface is not necessarily directly connected to the towing vehicle interface, but may be connectable to an adapter or cable connected to both the towed vehicle interface and the towing vehicle interface.

The power charging system also includes a control system comprising a communication system and a controller. The communication system is configured to communicate operational data representative of operational conditions of the charging device and the energy storage device to a controller. The controller is operably coupled to the charging device and is configured to control the operation of the charging device based upon the operational characteristics. For instance, the controller may receive an energy storage device charge status indicating a charge level via the communication system, and the controller may then control whether the charging device is used to charge the energy storage device based on the charge status.

The power charging system is configured to transfer charging power of least 1 kW from the charging device to the energy storage device. In other words, the towed vehicle interface and the towing vehicle interface, charging device, and any connectors, cables, pins, circuitry, etc. of the power charging system are properly sized and configured to safely transfer at least 1 kW of charging power from the charging device to the energy storage device. Alternatively, in additional aspects, the power charging system may be configured to transfer charging power from the charging device to the energy storage device of least 2 kW, or at least 4 kW, or at least 5 kW, or at least 7 kW. The higher transfer charging power allows faster charging and timely charging of ever larger energy storage devices. For instance, the energy storage device may have a capacity of at least 2 kW-hr, or at least 3.5 kW-hr, or at least 7 kW-hr or from 2 kW-hr to 50 kW-hr, or at least 50 kW-hr, or at least 75 kW-hr.

In another aspect of the power charging system, the charging device comprises an alternator and an alternator controller. For instance, in one aspect of the invention, the alternator may be the chassis alternator of the towing vehicle. Alternatively, in another aspect, the alternator may be separate alternator to the chassis alternator which is dedicated to the power charging system and does not power or charge any towing vehicle equipment. The alternator controller may be a regulator which controls the operation of the alternator (e.g., controlling the field on the alternator).

In still another aspect of the disclosed invention, the charging device may comprise an electrical power source and a power conversion device. For instance, in additional aspects, the electrical power source may be a battery, a lithium-ion battery, a lead acid battery, a capacitive storage device, a solid-state battery, an electrical vehicle battery, an alternator, a fuel cell, or any combination thereof. In yet another aspect, the power conversion device may be a DC-DC converter, a DC-AC converter, an AC-DC converter, a pulse width modulation controller, a current limiting wire, or a current limiting self-resetting device.

In additional aspects, the towed vehicle interface and the towing vehicle interface may each comprise a single housing carrying both the charging power and operational data. For instance, each interface may be integrated into a single polymer housing which has high-power pins or contacts for carrying the charging power and auxiliary pins or contacts for carrying operational data. Alternatively, in another aspect, the towed vehicle interface and the towing vehicle interface may each comprise a power housing for carrying the charging power, and a physically separate data housing for carrying at least some of the operational data and not carrying any of the charging power. As an example, each power housing may be a polymer housing having high-power pins or contacts for carrying the charging power, and each separate data housing may be a polymer housing having pins or contacts for carrying operational data but not charging power. In another aspect, at least some of the other operational data may not be carried by the data housing, but may be carried by yet other connector housings or even in simple signal wires, or wirelessly.

In still another aspect, the communication system may be configured to communicate the operational data using a digital communication protocol. For example, the communication system may utilize a controller area network (CAN) having a CAN bus, or an Ethernet network, or other suitable digital communication protocol. In still another aspect, the communication system may comprise a wireless communication protocol, such as WiFi, Bluetooth, wireless USB, Zigbee, and cellular phone protocol.

In another aspect of the power charging system, the signal wires may include analog sensing wires. For instance, the analog sensing wires may include one or more of a battery voltage sensing wire, a battery temperature wire, a thermocouple wire, a battery current sensing wire, a battery charge requested signal wire, and/or an encoded battery state signal wire.

Alternatively, the signal wires may include one or more of a digital signal wire; a signal level wire, and an analog sensing wire, or any combination thereof. The signal wires carry operational data used by the controller to control the operation of the power charging system. Hence, in one aspect, the signal wires may include one or more of: a connection present signal wire which indicates whether the towing vehicle interface and towed vehicle interface are connected; a battery charging status signal wire which indicates whether charging of the battery is enabled, charging of the battery is disabled, and charge state to be maintained in which the battery the charging device supplies power to other loads in the trailer and only provides power to the battery to maintain a current state of charge.

In another aspect, the operational data may include a charging status of the energy storage device, including a charging enable status and a charging disabled status. Accordingly, the charging status of the energy storage device indicates when the energy storage device is enabled to be charged, and when it is disabled from being charged. For instance, when the battery is not fully charged the charging status may indicate a charging enabled status, and when the battery is fully charged the charging status may indicate a charging disabled status. In another aspect, the charging status may also further include the charging needs of the energy storage device, such as how much energy is needed to fully charge the energy storage device, and/or a charging rate at which to charge the energy storage device.

In still another aspect of the disclosed power charging system, the energy storage device may include a storage device management system (SDMS). In such case, the charging status may be determined by the SDMS and communicated from the SDMS to the controller. For instance, in the case of a battery as the energy storage device, the SDMS may be a battery management system (BMS). The SDMS may be a microcontroller having a processor, or it may be as simple as a logic circuit which provides a charge enable and charge disable signal to the controller to signal the controller whether to provide charging power to the energy storage device. Alternatively, the SDMS may be configured to communicate operational data regarding the energy storage device to the controller, and the charging status may be determined by the controller based upon the operational data obtained from the SDMS.

In another aspect, the operational data may include present properties of the energy storage device, including present state of temperature, state of charge, capacity, voltage, and amperage into or out of energy storage device. In still other aspects, the operational data may further include specifications of the energy storage device, present needs of the charging device and energy storage device, and warnings, alarms and faults of both the charging device and energy storage device. In yet additional aspects, the operational data may also include the operational status of the charging device, the specifications of the charging device, the operational status of the energy storage device, and the specifications of the energy storage device, where the operational status of the charging device includes one or more of the following properties of the charging device: current output; voltage output; temperature; overheating status; percentage utilization; operating mode, including standby, active, initializing, faulted state; identification of faults, including overheated, internal fault condition-logic error, battery not communicating, lost communication, broken sensor, battery fault; target voltage, energy storage voltage, target energy storage current; the operational status of the energy storage device includes one or more of the following properties of the energy storage device: present state of charge, present energy storage capacity; present voltage; present temperature; present current; charging mode, including charging enabled or charging disable; target energy storage voltage; target energy storage current; number of battery management systems (BMS's) present; whether energy storage device is online; fault state; and state of health; the specifications of the energy storage device include one or more of the following: type of energy storage device; overall storage capacity of battery; charging current limits of energy storage device; charging current limits of the BMS; charging voltage limits; charging temperature limits; and charging rate limits; and the specifications of the charging device include one or more of the following: output amperage capacity; output voltage; allowable operating temperature range; and power output capacity.

In yet another aspect of the power charging device, the controller may be configured to selectably de-power the towing vehicle interface and the towed vehicle interface prior to disconnecting the towing vehicle interface from the towed vehicle interface. This feature can protect the charging device by avoiding rapid removal of the load on the charging device which may damage the charging device (e.g., damage to an alternator).

In still another aspect, the controller may be configured to only power the towing vehicle interface and the towed vehicle interface when the towing vehicle interface is connected to the towed vehicle interface. For example, the controller can be configured to control switches between the towing vehicle interface and the charging device and between the towed vehicle interface and the energy storage device based on the connection status, and to only close the switches to power the respective interfaces when the controller detects that that the towing vehicle interface is connected to the towed vehicle interface. For instance, the power charging system may have a connection sensing device which detects when the towing vehicle interface and towed vehicle interface are connected, and the connection sensing device is operably coupled to the controller so the controller can determine whether there is a connection.

In yet another aspect, the controller may be configured to selectably de-power the towing vehicle interface and the towed vehicle interface based upon a manually actuatable input by an operator. For example, the power charging system can have a button, switch, or other input device which an operator can actuate/select which signals the controller to de-power the towing vehicle interface and the towed vehicle interface (e.g., using switches, as described above).

In additional aspects, the power charging system may also include a safe state indicator which indicates when it is safe to disconnect the towing vehicle interface and the towed vehicle interface upon de-powering of the towing vehicle interface and the towed vehicle interface. As some examples, the safe state indicator may be a light on one of towing vehicle interface and/or the towed vehicle interface, a light on the dashboard of the towed vehicle, a notification on a display device, or a notification on a software application ("app") on a handheld computing device.

In yet another aspect, the controller may be configured to selectably de-power the towing vehicle interface and the towed vehicle interface based upon an operational characteristic of the towing vehicle. For instance, the operational characteristic may be the towing vehicle being in park; the towing vehicle being in neutral, the towing vehicle being at idle, the towing vehicle parking brake being enabled, the towing vehicle engine being turned off, and/or the towing vehicle being below a maximum speed. Each of these operational characteristics may be predictive that the power charging system is not going to be in further use, or that an operator may be disconnecting, or may wish to disconnect in the near future, the towing vehicle interface from the towed vehicle interface. Hence, de-powering the interfaces upon these operating events is a safety measure which prevents an operating from handling a powered interface.

In additional aspects, the operational characteristics for de-powering the interfaces may be determined by one or more of: accessing the towing vehicle internal digital communications network; use of switches indicating position of transmission of the towing vehicle; use of switches indicating position of parking break mechanism of the towing vehicle; use of sensors to sense motion of the towing vehicle; use of sensors coupled to the charging device to indicate engine RPMs (revolutions per minute) of the towing vehicle; and use of sensors to indicate RPM of engine or transmission of the towing vehicle.

In yet another aspect, the power charging system may also have a physical safety interlock on at least one of the towing vehicle interface and the towed vehicle interface. The physical safety interlock prevents disconnection of the towing vehicle interface and the towed vehicle interface until the power charging system, including the interfaces, charging device and/or energy storage device, are in a safe state for disconnection. In another aspect, the physical safety interlock may be operably coupled to, and controlled by the controller. In this way, the controller can detect whether the interfaces, charging device and/or energy storage device are in a safe state prior and only actuate the physical safety interlock to allow disconnection when they are in the safe state.

In yet another aspect, the power charging system may also include a disconnect sensor configured to detect that the towing vehicle interface and the towed vehicle are being disconnected. For instance, the disconnect sensor may be disposed on at least one of the towing vehicle interface and the towed vehicle interface. The disconnect sensor may be operably coupled to the controller, and the controller can be configured to de-power the towing vehicle interface and the towed vehicle interface upon detecting that the towing vehicle interface and the towed vehicle are being disconnected.

In still another aspect, the towing vehicle interface, the towed vehicle interface and the disconnect sensor may be configured such that the disconnect sensor detects that towing vehicle interface and the towed vehicle interface are being disconnected prior to a power connection between the towing vehicle interface and the towed vehicle interface carrying charging power from the charging device is disconnected. This allows the controller to de-power the towing vehicle interface and the towed vehicle interface prior to the power connection being disconnected, thereby preventing an unsafe condition in which one or both of the interfaces are powered and disconnected. For instance, the controller can be configured to de-power the towing vehicle interface and the towed vehicle interface based upon the disconnect sensor detecting that the towing vehicle interface and the towed vehicle are being disconnected prior to the power connection being disconnected.

In another feature, the power charging device may also have a human user interface configured to communicate a status of the power charging system. As some examples, the human user interface may be a dashboard display on the towing vehicle; one or more indicator lights; a graphical display device; an LCD display; an LED display; an OLED display; and a wireless communication module configured to communicate with a software app on a handheld computing device. In yet another feature, the human user interface may be integrated with a fleet vehicle monitoring system to allow the fleet vehicle monitoring system to monitor the status of a fleet of towing vehicles and respective towed vehicles, including the status of the respective power charging systems. In one embodiment, the human user interface may be dedicated to the power charging system, or alternatively, it can be a human user interface of the towing vehicle or towed vehicle which is operably coupled to the power charging system.

The power charging system may include any one or more of the aspects and features described herein, and need not include all of the various aspects and features. Accordingly, an improved power charging system for a towing vehicle and a towed vehicle connectable to the towing vehicle is disclosed. The power charging system is capable of safely transferring high power levels, above 1 kW to 7 kW, from a charging device on the towing vehicle to an energy storage device on the towed vehicle. The power charging system may also be configured to safely de-power components of the system to prevent hazardous conditions which can create a risk of accidental electrical shock and/or damage to the system components.

Another embodiment of the presently disclosed invention is directed to a subsystem, also referred to as a control system, for the power charging system disclosed herein. The subsystem may be an assembled device or module, or it may be a kit comprising a plurality of devices and/or module which can be assembled, connected, and/or installed into a power charging system. For instance, the subsystem may be installed into a towing vehicle and/or towed vehicle which already have a charging device and/or energy storage device installed.

Accordingly, in one embodiment, a subsystem is disclosed for a power charging system comprising a charging device disposed on the towing vehicle and an energy storage device disposed on a towed vehicle connectable to the towing vehicle. For example, the power charging system may comprise any embodiment of the power charging system disclosed herein. The subsystem comprises a controller configured to be operable coupled to a communication system of the towing vehicle for receiving operational data representative of operational conditions of the charging device and the energy storage device. The controller is configured to operably couple to the charging device and to control the operation of the charging device based upon the operational data. The controller has an input connection for being connected to a storage device management system for the energy storage device. For instance, the input connection may be a CAN bus port. The controller is configured to detect whether the controller is connected to the storage device management system in order to determine whether a towing vehicle interface is connected to a towed vehicle interface. The controller is programmed (e.g., software and/or firmware) to only power the towing vehicle interface with the charging device when detecting a connection to the storage management device and to de-power the towing vehicle interface when detecting a disconnection of the controller from the storage device management system.

In another aspect of the subsystem, the controller powers the towing vehicle interface by at least one of (i) powering on the charging device and (ii) connecting an output of the charging device to the towing vehicle interface, and de-powers the towing vehicle interface by at least one of (i) de-powering the charging device and (ii) disconnecting the output of the charging device to the towing vehicle interface.

In another aspect, the charging device comprises a towing vehicle disconnect device for connecting and disconnecting the output of the charging device to the towing vehicle interface. In still another aspect, the towing vehicle disconnect device is one of a relay and a switch.

In yet another aspect of the subsystem, the charging device comprises an alternator, and the controller is configured to function as a regulator for the alternator. The controller is configured powers on and de-power the charging device by regulating the alternator. In another aspect, the subsystem may further comprise the alternator.

In still another aspect of the subsystem, the charging device may comprise an alternator and a regulator. The controller powers on and de-powers the charging device by controlling the regulator which in turn controls the charging device.

In another aspect, the alternator may be a secondary alternator to a chassis alternator of the towing vehicle. The secondary alternator may be dedicated to the power charging system and is not configured for powering or charging any towing vehicle equipment.

In another aspect, the charging device may comprise an alternator and a converter and the controller powers the towing vehicle interface by at least one of (i) powering on the converter, (ii) connecting an output of the converter to the towing vehicle interface, and de-powers the towing vehicle interface by at least one of (i) powering off the converter and (ii) disconnecting the output of the converter from the towing vehicle interface. In still another aspect, the subsystem may further comprise the alternator and the converter.

In another aspect, the connection that the controller is configured to detect to determine whether the controller is connected to the storage device management system is one of a CAN bus connection, an Ethernet connection and an RS-485 connection.

In still another aspect, the subsystem further comprises a towed vehicle disconnect device electrically connected between the energy storage device and a towed vehicle interface which is configured to be connected to the towing vehicle interface. The towed vehicle disconnect device is configured to electrically connect and disconnect the electrical connection between the energy storage device and the towed vehicle interface.

In another aspect, the towing vehicle interface may include a disconnect device connection connected to a towed vehicle disconnect circuit. The towed vehicle disconnect device is configured to connect a connection between the energy storage device and the towed vehicle interface when the towed vehicle interface is connected to the towed vehicle disconnect circuit, and to disconnect the connection between the energy storage device and the towed vehicle interface when the towed vehicle interface is disconnected from the disconnected device circuit. In still another aspect, the towed vehicle disconnect device may comprise one of a switch and a relay, and the towed vehicle disconnect circuit is connected to one of a ground wire or a hot wire on the towing vehicle and the towed vehicle disconnect device is connected to the other of a ground wire or a hot wire on the towed vehicle.

In another aspect of the subsystem, the controller is configured to selectably de-power the towing vehicle interface based upon an operational characteristic of the towing vehicle. For example, the operational characteristic may be one or more of: the towing vehicle being in park; the towing vehicle being in neutral; the towing vehicle being at idle; the towing vehicle parking break being enabled; the towing vehicle engine being turned off; and the towing vehicle being below a maximum speed.

In another aspect, the operational characteristic may be determined by one or more of: accessing a towing vehicle internal digital communications network; use of switches indicating position of transmission of the towing vehicle; use of switches indicating position of parking break mechanism of the towing vehicle; use of sensors to sense motion of the towing vehicle; use of sensors coupled to the charging device to indicate engine RPMs of the towing vehicle; and use of sensors to indicate RPM of engine or transmission of the towing vehicle.

In another aspect, the controller de-powers the towing vehicle interface by at least one of (i) powering on the charging device and (ii) connecting an output of the charging device to the towing vehicle interface, and de-powers the towing vehicle interface by at least one of (i) de-powering the charging device and (ii) disconnecting the output of the charging device to the towing vehicle interface.

In yet another aspect, the charging device comprises a towing vehicle disconnect device for connecting and disconnecting the output of the charging device to the towing vehicle interface. In another feature, the towing vehicle disconnect device is one of a relay and a switch.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION

Figure 1:
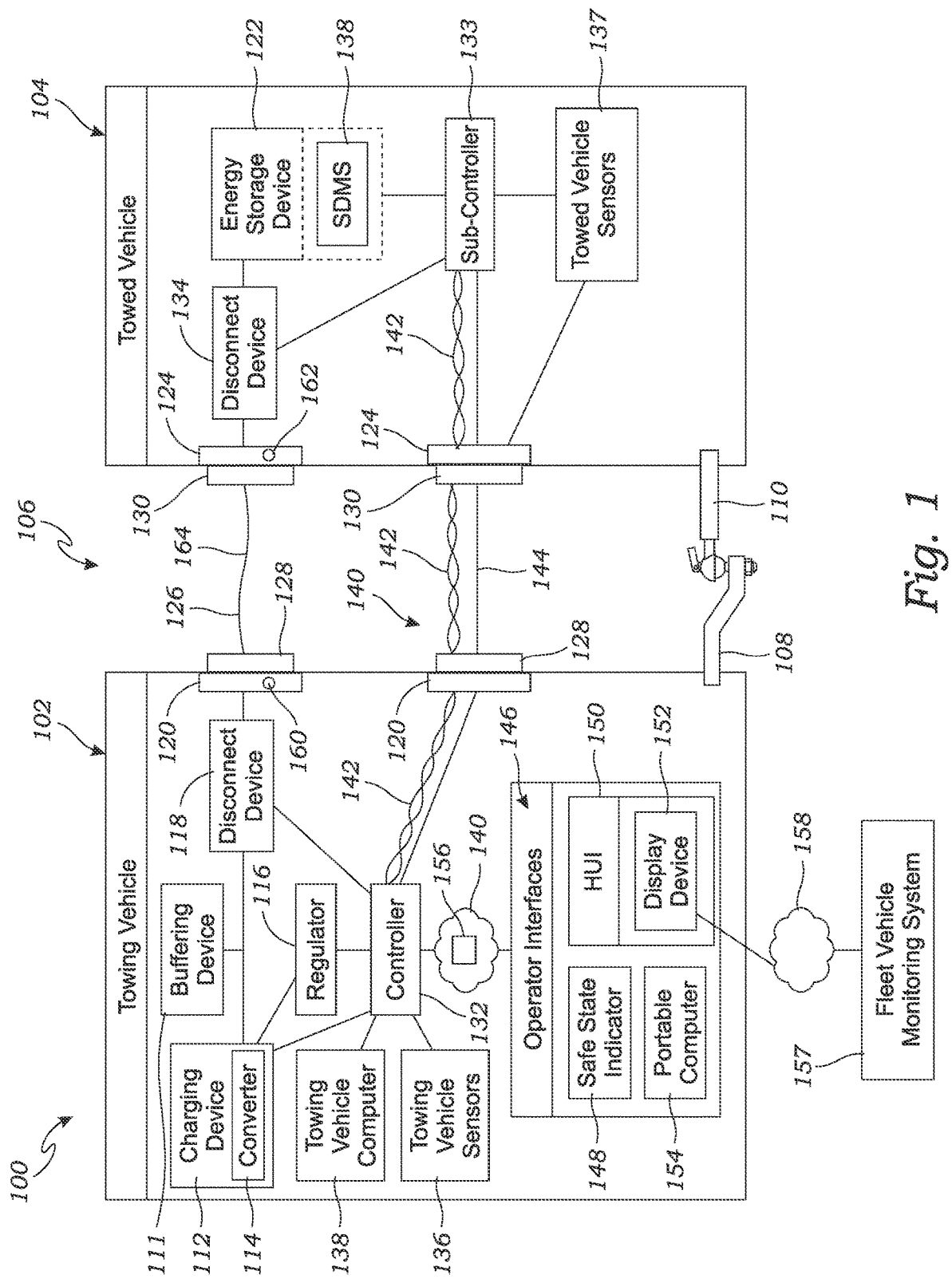
FIG. 1 is a block diagram of a power charging system for a towing vehicle and towed vehicle combination for transferring high charging power, according to one embodiment of the present invention.

Referring to FIG. 1, a block diagram of one exemplary embodiment of a power charging system 100 for a towing vehicle 102 and towed vehicle 104 combination for transferring high charging power from the towing vehicle 102 to the towed vehicle 104 is illustrated. The power charging system 100 is shown as installed in a towing/towed vehicle combination 106. The towing vehicle 102 may be any type of vehicle, including for example, tractors, trucks, automobiles, motor vehicles, etc., having a motor (engine) which may be an internal combustion engine, electric motor, or other suitable motor. The towed vehicle may be any type of trailer, including for example, cargo trailers, camper trailers, utility trailers, livestock trailers, boat trailers, equipment trailers, fifth wheelers, car haulers, etc. The towing vehicle 102 has a trailer hitch 108 which couples to a trailer coupler 110 on the towed vehicle 104 for providing the mechanical connection between the towing vehicle 102 and the towed vehicle 104. The trailer hitch 108 and trailer coupler 110 may be any suitable hitch/coupler combination, such as a ball/receiver, fifth-wheel/king-pin, pintle/ring, etc.

The power charging system 100 includes a charging device 112 installed on the towing vehicle 102. The charging device 112 provides the charging power for the system 100, which is typically electric power. The charging device 112 may be an alternator on the towing vehicle 102. An alternator is an electric generator which is driven by the motor of the towing vehicle to produce electric power. The charging device 112 may also be battery (such as an accessory battery disposed on the towing vehicle 102), a lithium-ion battery, a lead acid battery, a capacitive storage device, a solid-state battery, an electrical vehicle battery, a fuel cell, or any combination of the charging devices 112 disclosed herein.

The charging device 112 may also include a converter 114 which converts the output electric power from the charging device 112, such as the output electric power from an alternator or a battery, to a different voltage or from direct current (DC) to alternating current (AC) or vice versa. For example, the charging device 112 may be an alternator which outputs AC electric power at an output voltage, and the converter converts the AC electric power to DC electric power at a converted voltage, typically about 14 V in standard automobiles. In the case of the charging device 112 comprising an alternator, the charging device 112 may also include a regulator, also called an alternator controller, which controls the operation of the alternator (e.g., controlling the field on the alternator). Hence, the converter 114 may be a DC-DC converter, a DC-AC converter, an AC-DC converter, a pulse width modulation controller, a current limiting wire, and a current limiting self-resetting device.

The power charging system 100 may also include an optional buffering device 111. The buffering device 111 is configured to store charging power from the charging device 112, and to provide the charging power to the power charging system 100, for example, when the charging device 112 is unavailable to provide charging power. Hence, the buffering device 111 may be any suitable battery, such as lead acid battery, Li-ion battery, a capacitive storage device, a solid-state battery, or other storage device configured to store power and output the stored power as electric power. Thus, in the case of power charging system 100 having a buffering device 111, wherever it is described that the charging device 112 provides electric power, such electric power may be provided by the buffering device 111. For instance, when the charging device 112 is unavailable (e.g., when an alternator is not producing electric power because the towing vehicle motor is not running).

In the case of a charging device 112 comprising an alternator, the alternator can be the chassis alternator of the towing vehicle 102. In other words, the alternator on the towing vehicle 102 which provides electrical power to the towing vehicle 102 for powering the electrical systems and components of the towing vehicle 102, including charging a battery on the towing vehicle 102. Alternatively, the alternator may be a dedicated alternator dedicated to the power charging system 100 which is used only to provide electric power to the power charging system 100 and which does not power any other equipment of the towing vehicle 102. The dedicated alternator is also driven by the motor of the towing vehicle 102. The dedicated alternator may also have a separate regulator for controlling the operation of the dedicated alternator (e.g., controlling the field on the dedicated alternator). Alternatively, a single regulator may be configured to control both the chassis alternator and the dedicated alternator.

The power charging system 100 also includes a towing vehicle disconnect device 118 electrically connected between the charging device 112 and a towing vehicle interface 120. The towing vehicle disconnect device 118 is configured to selectably electrically connect and disconnect the electrical connection between the charging device 112 and the towing vehicle interface 120. The towing vehicle disconnect device 118 may be a switch or relay, or the like.

The towing vehicle interface 120 is a connector for electrically connecting the charging device 112 on the towing vehicle 102 to an energy storage device 122 on the towed vehicle 104. The towing vehicle interface 120 is configured to be connected and disconnected with a towed vehicle interface 124 on the towed vehicle 104. The towing vehicle interface 120 may be any suitable electrical connector, plug, or the like. The towing vehicle interface 120 and towed vehicle interface 124 may not directly connect to each other, but may each be connectable to opposite ends of a connection cable 126 or an adapter for completing the electrical connection between the towing vehicle interface 120 and the towed vehicle interface 124. The connection cable 126 has a towing vehicle connector 128 on a first end of the connection cable 126 and connectable to the towing vehicle interface 120, and a towed vehicle connector 130 on a second end of the connection cable 126.

The power charging system 100 also has a controller 132 for controlling the operation of the power charging system 100. The controller 132 is a computing system comprising a microprocessor, memory, input and output connections and buses, one or more communication adapters, one or more storage devices (e.g., hard drive, memory, etc.), and software and firmware which programs the controller 132 to perform the functions as described herein. The controller 132 is operably coupled to the charging device 112, the towing vehicle disconnect device 118, and may also be operably coupled to various other components of the power charging system 100, as described herein. The controller 132 is configured to control the operation of the charging device 112 based upon operational data received by the controller 132, such as operational data from various sensors and/or management systems on the towing vehicle 102 and/or towed vehicle 104. For example, the controller 132 is operably coupled to towing vehicle sensors 136, towed vehicle sensors 137, a vehicle computer 136, and/or a storage device management system (SDMS) 138 via a communication system 140. As described in more detail herein, each of these components can provide operational data to the controller 132 which the controller 132 can use to control the operation of the charging system 100, including the operation of the charging device 112, the towing vehicle disconnect device 118 and/or a towed vehicle disconnect device 134. In the case that the charging device is an alternator, the controller 132 may be integrated with, or operably coupled to, the regulator to control the operation of the alternator, including enabling and disabling the alternator, and controlling the power output of the alternator, based upon the operational data received by the controller 132. As described in more detail below, the controller 132 also controls the operation of the towing vehicle disconnect device 118 and/or the towed vehicle disconnect device 134.

The power charging system 100 also has a communication system 140 for providing communication between one or more of the components of the power charging system 100, including between the controller 132, towing vehicle sensors 136, towing vehicle sensors 137, a vehicle computer 136, (SDMS) 138 and/or a sub-controller 133. The communication system 140 may include a communication network operably coupled to each of these components for providing communication between the components. As an example, the communication network may comprise a CAN network in which each of the components is connected to the network via a two wire CAN bus 142. Alternatively, the communication system 140 may comprise an Ethernet network, a RS-485, wireless communication network having a wireless communication protocol (such as WiFi, Bluetooth, wireless USB, Zigbee, cellular phone protocol, etc.). The communication system 140 may also include one or more signal wires 144 operably coupling the controller 132 to other components, such as to the towing vehicle sensors 134, towed vehicle sensors 137, and/or sub-controller 133. The signal wires 144 may include analog sensing wires, including one or more of a battery voltage sensing wire (connected to a battery voltage sensor), a battery temperature wire (connected to a battery temperature sensor), a thermocouple sensing wire (connected to a thermocouple), a battery current sensing wire (connected to a current sensor), an energy storage device charge requested signal wire (connected to the SDMS 138 and/or sub-controller 133), and an encoded battery state signal wire (connected to the SDMS 138 and/or sub-controller 133). The signal wires 144 may also include CAN bus wires 142 (e.g., CAN twisted pair), analog level wires, digital signal wires, Ethernet cables, etc.

Turning to the components of the power charging system 100 on the towed vehicle 102, the energy storage device 122 is an electrically re-chargeable device for storing energy and outputting the stored energy as electric power for powering equipment on the towed vehicle 102, such as appliances, lighting, heating, ventilation and air conditioning (HVAC), and other electrical devices on the trailer and/or auxiliary equipment outside the towed vehicle 102, like camping equipment, pumps, lights, cooking equipment, etc. As some non-limiting examples, the energy storage device 122 may be a chemical battery, such as a lead acid battery, Li-ion battery, a capacitive storage device, a solid-state battery, etc.

The towed vehicle interface 124 is configured to be connected and disconnected with the towing vehicle interface 124 on the towed vehicle 104. The towed vehicle interface 124 may be any suitable electrical connector, plug, or the like. As depicted in the example of FIG. 1, the towing vehicle interface 120 and towed vehicle interface 124 may not directly connect to each other, but may each be connectable to opposite ends of a connection cable 126 or an adapter for completing the electrical connection between the towing vehicle interface 120 and the towed vehicle interface 124. Alternatively, the towed vehicle interface 124 and towing vehicle interface 120 may be configured to connect directly to each other.

The towed vehicle disconnect device 134 is configured to selectably electrically connect and disconnect the electrical connection between the energy storage device 122 and the towed vehicle interface 124. The towed vehicle disconnect device 134 may be a switch or relay, or the like.

The power charging system 100 may also have a sub-controller 133 for controlling the operation of the power charging system 100. The sub-controller 133 may be a part of the controller 132 that operates in conjunction with the controller 132, or it may be a separate module which is in operable communication with controller 132, or it may be integrated with the controller 132 as an integrated module. The sub-controller 133 is operably coupled to the charging device energy storage device 122, the towed vehicle disconnect device 134, and may also be operably coupled to various other components of the power charging system 100, as described herein. The sub-controller 133 is configured to control the operation of the towed vehicle disconnect device 134 based upon signals and/or operational data received from the controller 132 and/or from various sensors and/or management systems on the towing vehicle 102 and/or towed vehicle 104. For example, the sub-controller 133 may be operably coupled to the SDMS 138 and/or the towed vehicle sensors 137 via the communication system 140. As described in more detail herein, each of these components can provide operating signals and/or operational data to the sub-controller 133 which it can use to control the operation of the charging system 100, including the operation of the energy storage device 122 and/or the towed vehicle disconnect device 134. It should be understood that the controller 132 and sub-controller 133 may be installed on either the towing vehicle 102 or the towed vehicle 104, as they can communicate with components on either towing vehicle 102 or the towed vehicle 104 via the communication system 140.

The power charging system 100 also has one or more operator interfaces 146 for providing outputs to an operator and/or for receiving inputs from an operator. The operator interfaces 146 include one or more safe state indicators 148 which indicate when it is safe to disconnect the towing vehicle interface 120, the towed vehicle interface 124 and/or the connection cable 126 upon de-powering of the towing vehicle interface 120 and the towed vehicle interface 124. The safe state indicator 148 may be any suitable indicator including, without limitation, a light 160 on the towing vehicle interface 120, a light 162 on the towed vehicle interface 124, a light on the dashboard of the towed vehicle, a notification on a display device 152, and/or a notification on a software app on a portable computing device 154. The portable computing device 154 may be any suitable computing device, including without limitation, a laptop computer, a tablet computer, a handheld computing device, a cellular phone, a smartphone, etc.

The operator interfaces 146 may also include a human user interface 150 having a display device 152. The human user interface 150 is configured to communicate a status of the power charging system 100 to an operator, and also allow the operator to make inputs to the power charging system 100 to control the operation of the power charging system 100. The human user interface 150 may be a system dedicated to the power charging system 100, or it may be integrated with a human interface system of the towing vehicle 102 or the towed vehicle 104. For example, the human user interface 150 may be integrated with the towing vehicle computer 138 has a vehicle display and an input device such as a touchscreen, touchpad, joystick, or the like. The human user interface 150 may comprise a computing device having a graphical display device 152 such as an LCD display, an LED display or an OLED display, a dashboard display on the towing vehicle 102, one or more indicator lights, and/or a wireless communication module 156 configured to communicate with the portable computing device 154 having software app for interfacing with the power charging system 100.

The power charging system 100 may also be in communication and integrated with a fleet vehicle monitoring system 157 to allow the status of the charging system 100 to be monitored along with a fleet of vehicles having installed power charging systems 100. In one way, the human user interface 150 may be in communication with the fleet vehicle monitoring system via a wireless communication network 158.

Figure 2:
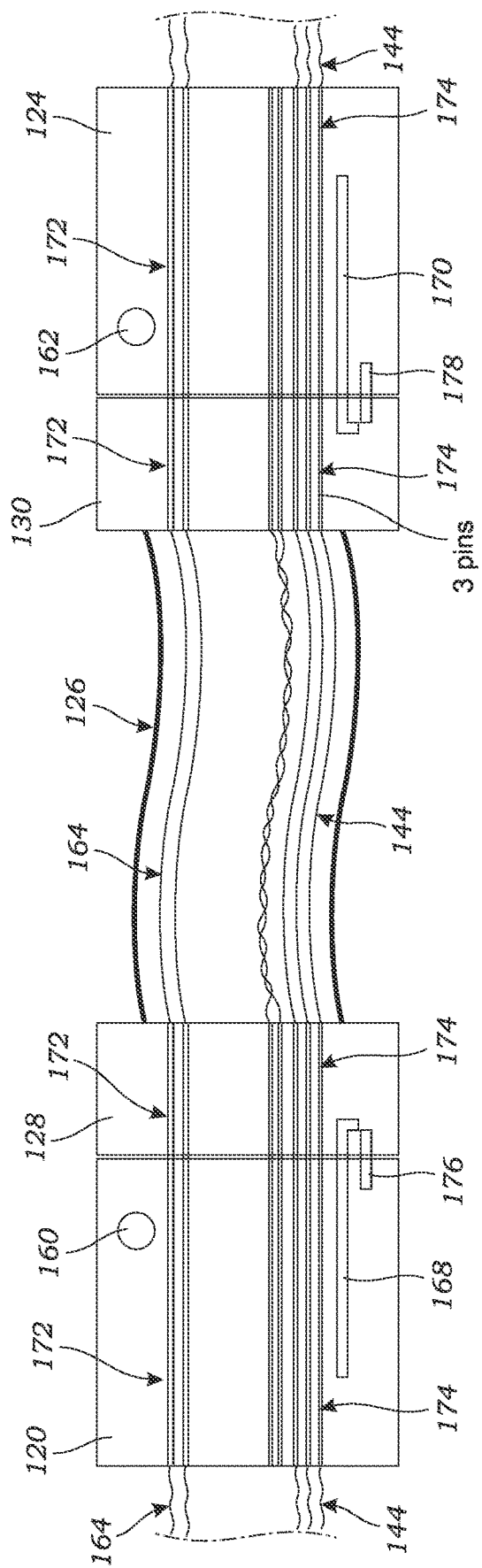
FIG. 2 is a side view of a schematic of a single housing embodiment of the towing vehicle interface and towed vehicle interface which may be utilized in the power charging system of FIG. 1.
Figure 3:
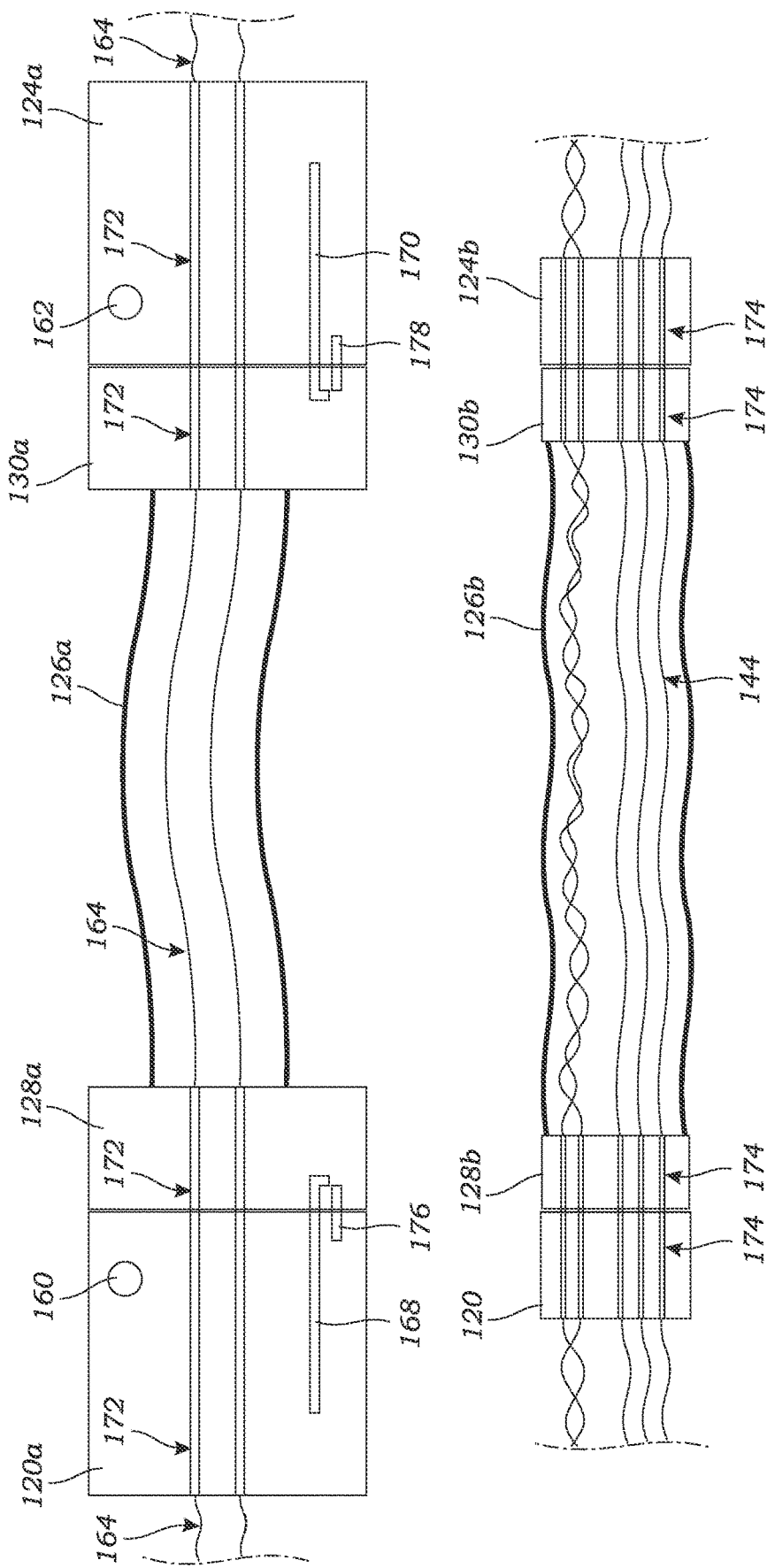
FIG. 3 is a side view of a schematic of a dual housing embodiment of the towing vehicle interface and towed vehicle interface which may be utilized in the power charging system of FIG. 1.

Turning to FIGS. 2 and 3, schematic examples of embodiments of the towing vehicle interface 120, towed vehicle interface 124 and connection cable 126 are illustrated. FIG. 2 illustrates a single housing embodiment for carrying both the charging power and for carrying the signals/data through the towed vehicle interface 120, towing vehicle interface 124 and connection cable 126. In the embodiment of FIG. 2, each of the towing vehicle interface 120, the towed vehicle interface 124 and the towing vehicle connector 128 and towed vehicle connector 130 of the connection cable 126 comprises a single housing for carrying the charging power in the power wires 164 and for carrying the signals/data in the signal/data wires 166. Each of the towing vehicle interface 120, the towed vehicle interface 124, the towing vehicle connector 128 and towed vehicle connector 130 have high-power pins or contacts 172 for carrying the charging power and auxiliary pins 174 for carrying the operational data and signals from the signal wires 166.

The towing vehicle interface 120 may also have a towing vehicle disconnect sensor 176 which detects whether the towing vehicle interface 120 is connected or disconnected, and/or is being disconnected, from the towed vehicle interface 124 and/or the towing vehicle connector 128. The towing vehicle disconnect sensor 176 may be configured such that it can detect when the towing vehicle interface 120 is being disconnected, i.e., is in the process of being disconnected, prior to the high-power pins/contacts 172 of the towing vehicle interface 120 disconnecting from the mating high-power pins/contacts of the towing vehicle connector 128.

Similarly, the towed vehicle interface 124 may have a towed vehicle disconnect sensor 178 which detects whether the towing vehicle interface 120 is connected or disconnected, and/or is being disconnected, from the towed vehicle interface 124 and/or the towed vehicle connector 130. The towed vehicle disconnect sensor 178 is same or similar, and may have the same functionality, as the towing vehicle disconnect sensor 176. In one embodiment, the towing vehicle disconnect sensor 178 may simply be a conductive wire which connects to a ground when the towing vehicle interface 120 is connected to the towed vehicle interface 124, for example, see the signal wire 144v depicted in the electrical schematic of FIG. 4, and described below.

FIG. 3 illustrates a dual housing embodiment for carrying the charging power and the signals/data between the towing vehicle 102 and the towed vehicle 104. There is a first housing for each of a first towing vehicle interface 120a, a first towed vehicle interface 124a, and a first towing vehicle connector 128a and a first towed vehicle connector 130a of a first connection cable 126a for carrying the charging power. Accordingly, each of the first towing vehicle interface 120a, the first towed vehicle interface 124a, the first towing vehicle connector 128a and first towed vehicle connector 130a have high-power pins or contacts 172 for carrying the charging power. There is a physically separate second housing for each of a second towing vehicle interface 120b, a second towed vehicle interface 124b, and a second towing vehicle connector 128b and second towed vehicle connector 130b of a second connection cable 126b for carrying signals/data in the signal/data wires 166. Each of the second towing vehicle interface 120b, the second towed vehicle interface 124*b*, the second towing vehicle connector 128*b* and the second towed vehicle connector 130*b* have auxiliary pins or contacts 172 for carrying signals/data in the signal/data wires 166. The second housings of the second towing vehicle interface 120*b*, the second towed vehicle interface 124*b*, the second towing vehicle connector 128*b* and the second towed vehicle connector 130*b* do not carry charging power. However, the first housing of the first towing vehicle interface 120*a*, the first towed vehicle interface 124*a*, the first towing vehicle connector 128*a* and first towed vehicle connector 130*a* may also carry signals/data from other signal wires.

The towing vehicle interface 120 also has a physical safety interlock 168 which prevents disconnection of the towing vehicle interface 120 from the towed vehicle interface 124 via the connection cable 126, if utilized, until the power charging system 100 is in a safe state for disconnection. For instance, the physical safety interlock 168 may be actuated to prevent disconnection until the electric power is removed from the towing vehicle interface 120, such as by opening the towing vehicle disconnect device 118 and the towed vehicle disconnect device 134 and/or disabling the charging device 112 (e.g., disabling the alternator to prevent damage to the alternator from removing the load on the alternator). The physical safety interlock 168 may be operably coupled to, and actuated by, the controller 132, or it may be self-actuatable in response to detecting whether there is electric power at the towing vehicle interface 120.

The towed vehicle interface 124 also has a physical safety interlock 170 which prevents disconnection of the towed vehicle interface 124 from the towing vehicle interface 120 via the connection cable 126, if utilized, until the power charging system 100 is in a safe state for disconnection. For instance, the physical safety interlock 170 may be actuated to prevent disconnection until the electric power is removed from the towed vehicle interface 124, such as by opening the towing vehicle disconnect device 118 and the towed vehicle disconnect device 134 and/or disabling the charging device 112 (e.g., disabling the alternator to prevent damage to the alternator from removing the load on the alternator). The physical safety interlock 168 may be operably coupled to, and actuated by, the controller 132, or it may be self-actuatable in response to detecting whether there is electric power at the towing vehicle interface 120.

Figure 4:
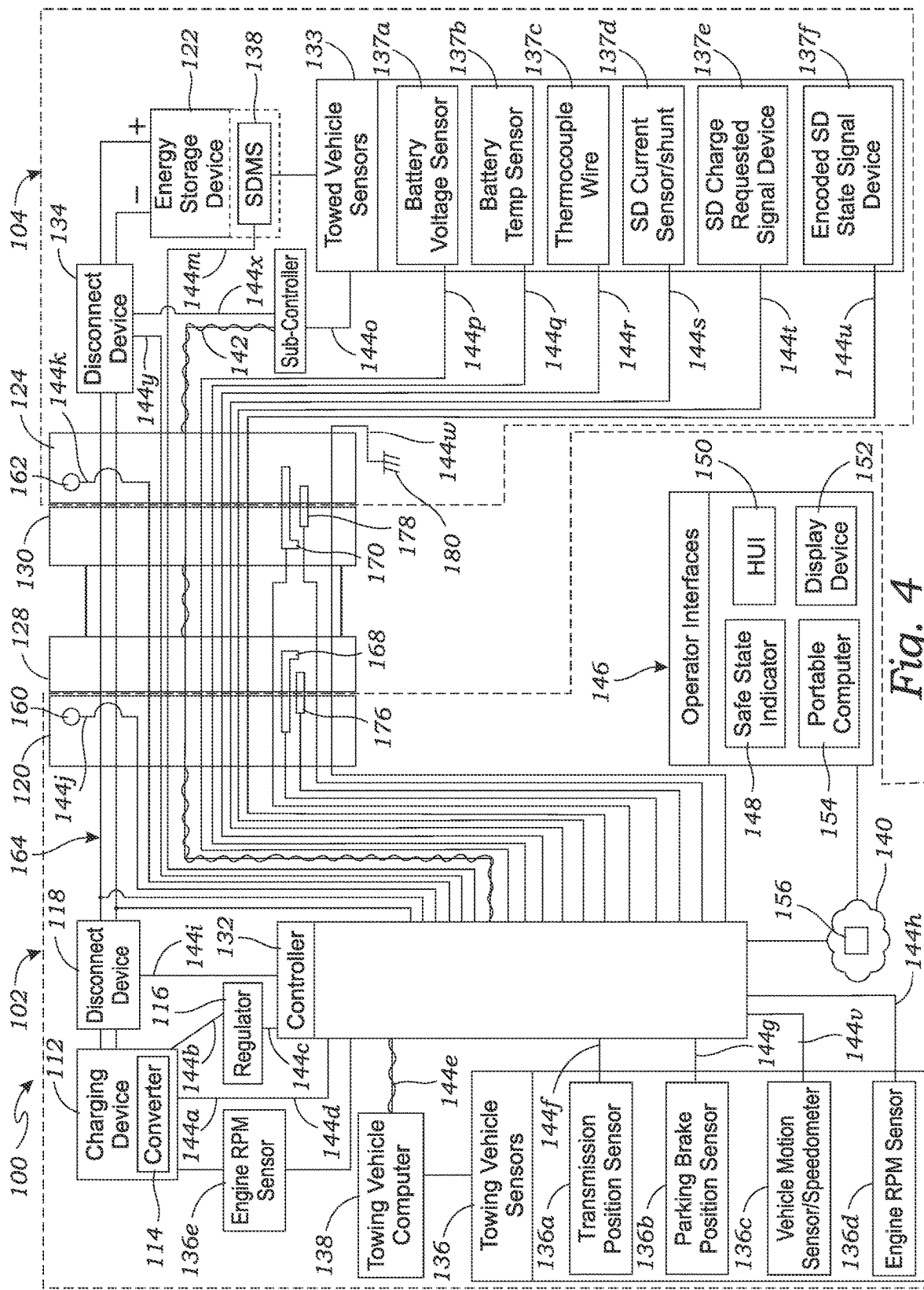
FIG. 4 is an electrical schematic of the power charging system of FIG. 1, according to one embodiment

Referring now to FIG. 4, an electrical schematic of the power charging system 100 is illustrated. The electrical schematic of FIG. 4 includes many of the possible electrical connections of components of the power charging system 100, including analog and digital connections. The electrical schematic of FIG. 4 is not intended to illustrate an actual embodiment of the power charging system 100, but is intended to show the various possible connections, only some of which would be used in actual power charging system. Because of the high number of possible enabling combinations of electrical connections, it is not possible to show an electrical schematic for each and every combination. Accordingly, some of electrical connections shown in FIG. 4 are redundant, and not all of the electrical connections are required for an operable power charging system 100. With the descriptions provided herein, one of ordinary skill in the art will be enabled to determine which electrical connections are needed based on the components utilized in a power charging system 100, to the full breadth of the inventions disclosed and claimed herein.

The controller 132 is in operable communication with the components of the power charging system 100 via the communication system 140 which comprises a plurality of signal wires 144, and a wireless communication module 156. As described above, the signal wires 144 may include analog sensing wires, CAN bus wires 142, analog level wires, digital signal wires, Ethernet cables, or other suitable communication wiring, etc. Unless specifically described otherwise, the signal wires 144 may be any of the types of wires described herein. Furthermore, any of the described signal wires 144 may be one or more wires, which are described as a single signal wire 144.

As illustrated in FIG. 4, the charging device 112 is connected to the controller 132 via signal wire 144*a*. The charging device 112 is also connected to the regulator 116 via signal wire 144*b*. The regulator 116 is connected to the controller via signal wire 144*c* for controlling the operation of the charging device 112. An engine rpm sensor 136*e* is operably coupled to the charging device 112 for detecting the engine rpm. The engine rpm sensor 136*e* is connected to the controller 132 via signal wire 144*d* for transmitting a signal from the engine rpm sensor 136*e* to the controller 132. The towing vehicle computer 138 is connected to the controller 132 via signal wire 144*e*, which may be a CAN bus wire 142, for transceiving operational data and signals between the towing vehicle computer 138 and the controller 132.

Each of the towing vehicle sensors 136 may be directly connected to the controller 132 to provide analog signals, analog level signals, or digital signals. The towing vehicle sensors 136 transmit a signal representative of certain operational data to the controller 132, as described herein. The transmission position sensor 136*a* is connected to the controller 132 via signal wire 144*f*. The transmission position sensor 136*a* detects the position of the transmission of the towing vehicle 102, such as whether the towing vehicle 102 is in drive, park, neutral, etc. The parking break position sensor 136*b* is connected to the controller 132 via signal wire 144*g*. The parking break position sensor 136*b* detects whether the parking break is actuated or de-actuated. The vehicle motion sensor/speedometer 136*c* is connected to the controller 132 via signal wire 144*h*. The vehicle motion sensor/speedometer 136*c* detects whether the towing vehicle 102 is moving and/or the speed of the towing vehicle 102. The engine RPM sensor 136*d* is connected to the controller 132 via signal wire 144*v*. The engine RPM sensor 136*d* detects the RPMs of the engine.

In addition, some or all of the towing vehicle sensors 136 may be connected to the towing vehicle computer 136 which receives the signals from the towing vehicle sensors 136. The towing vehicle computer 136 can then transmit the signals from such towing vehicle sensors 136 to the controller via the signal wire 144*e*.

Each of the operator interfaces 146, including the safe state indicator 148, portable computer 154, human user interface 150 and display device 152 are connected to the controller 132 via the communication system 140, such as additional signal wires 144, a wireless communication module 156, and/or other communication network.

The towing vehicle disconnect device 118 is connected to the controller 132 via signal wire 144*i*. The controller 132 is configured to actuate and de-actuate the towing vehicle disconnect device 118 via the signal wire 144*i* to selectably electrically connect and disconnect the electrical connection between the charging device 112 and the towing vehicle interface 120 based on operational data received by the controller 132. The towed vehicle disconnect device 134 is connected to the sub-controller 133 via signal wire 144*x*. The towed vehicle disconnect device 134 may also be connected to the controller 132 via signal wire 144*y*. The sub-controller 133 and/or controller 132 are configured to actuate the towed vehicle disconnect device 134 to selectably electrically connect and disconnect the electrical connection between the energy storage device 122 and the towed vehicle interface 124 based on operational data received by the controller 132 and/or sub-controller 133. In an alternative embodiment, the towed vehicle disconnect device 134 may simply be connectable to a disconnect device connection of the towing vehicle interface 118 which is in turn connected to a towed vehicle disconnect circuit. The towed vehicle disconnect device 134 is then configured to connect a connection between the energy storage device 122 and the towed vehicle interface 124 when the towed vehicle interface 124 is connected to the towed vehicle disconnect circuit (i.e., when the towed vehicle interface 124 is connected to the towing vehicle interface 120, such as by connecting the connection cable 126), and to disconnect the connection between the energy storage device 122 and the towed vehicle interface 124 when the towed vehicle interface 124 is disconnected from the disconnect device circuit. For instance, the towed vehicle interface 124 may be relay in which one pole is connected to a hot wire or ground wire on the towed vehicle 104 and the other pole is selectably connected and disconnected to the towed vehicle disconnect circuit which is connected to the other of a ground wire or a hot wire on the towed vehicle 102.

A local voltage sensing signal wire 144j is connected to the power wires 164 and the controller 132 to allow the controller 132 to detect the voltage across the power wires 164 at a position between the towing vehicle disconnect 118 and the energy storage device 122.

The safe state indicator light 160 is connected to the controller 132 via signal wire 144j 148. The safe state indicator light 162 is connected to the controller 132 via signal wire 144k. The SDMS is connected to the controller 132 via signal wire 144m. The sub-controller 133 is connected to the controller 132 via CAN bus wire 142. The SDMS 138 may also be connected to the sub-controller 133 such that the SDMS 138 communicates to the controller 132 via the sub-controller 133.

Each of the towed vehicle sensors 137 may be directly connected to the controller 132 to provide analog signals, analog level signals, or digital signals. Each of the towed vehicle sensors 137 transmits a signal representative of certain operational data to the controller 132, as described herein. The battery voltage sensor 137a is connected to the controller 132 via signal wire 144p. The battery voltage sensor 137a detects the voltage of the energy storage device 122. The battery temperature sensor 137b is connected to the controller via signal wire 144q. The battery temperature sensor 137b detects the temperature of the energy storage device 122. The thermocouple wire 137 is connected to the controller 132 via signal wire 144r. The thermocouple wire 137 detects a temperature, such as the temperature of the energy storage device 122. The battery current sensor/shunt 137d is connected to the controller 132 via signal wire 144s. The battery current sensor/shunt 137d detects the current flowing at the output of the energy storage device 137d. The battery charge requested signal device 137e is connected to the controller 132 via signal wire 144t. The battery charge requested signal device 137e provides a signal to the controller 132 as to whether the energy storage device 122 is requesting to be charged, and may be a signal level wire in which the controller 132 determines whether the energy storage device 122 is requesting to be charged based on the voltage level, or a digital signal wire which provides a digital signal to the controller 132 as to whether the energy storage device 137 is requesting to be charged.

The encoded battery state signal device 137f is connected to the controller 132 via signal wire 144u. The encoded battery state signal device 137f detects a state of the energy storage device 122, including one or more of the following: overheating status; percentage utilization; operating mode, including standby, active, initializing, faulted state; identification of faults, including overheated, internal fault condition-logic error, battery not communicating, lost communication, broken sensor, battery fault; target voltage, energy storage voltage, target energy storage current; present state of charge, present energy storage capacity; present voltage; present temperature; present current; charging mode, including charging enabled or charging disable; target energy storage voltage; target energy storage current; number of SDMS's (e.g., BMS's) present; whether energy storage device is online; fault state; and state of health; type of energy storage device; overall storage capacity of battery; charging current limits of energy storage device; charging current limits of the BMS; charging voltage limits; charging temperature limits; and charging rate limits; and the specifications of the charging device include one or more of the following: output amperage capacity; output voltage; allowable operating temperature range; and power output capacity. The encoded battery state signal device 137f may also be a battery charging status signal wire which indicates whether charging of the battery is enabled, charging of the battery is disabled, and/or a charge state to be maintained in which the charging device supplies power to other loads in the trailer and only provides power to the battery to maintain a current state of charge.

An electrical ground 180 on the towed vehicle 104 is connected to the controller 132 via signal wire 144w. The signal wire 144w and electrical ground 180 can be used by the controller 132 to determine whether there is a connection between the towing vehicle interface 120 and the towed vehicle interface 124. For example, the controller 132 can determine whether the connection cable 126 is fully connected to the towing vehicle interface 120 and the towed vehicle interface 124.

Furthermore, some or all of the towed vehicle sensors 137 may be connected, and/or integrated with the SDMS 138, instead of being connected to the controller 132, or in addition to being connected to the controller 132. The SDMS 138 receives the signals from the towed vehicle sensors 137, and the SDMS can then transmit the signals from such towed vehicle sensors 137 to the controller 132 via the signal wire 144m. Also, the SDMS 138 may be connected to the sub-controller 133, in which case, the SDMS 138 can transmit any signals from the SDMS and/or from the towed vehicle sensors 137. Then, the sub-controller 133 can transmit such signals to the controller 132 via the CAN bus signal wires 142.

The power charging system 100 is configured to safely transfer high charging power from the charging device 112 to the energy storage device 122 for charging the energy storage device 122. All of the components carrying the charging power are configured to safely handle the high charging power of the power charging system 100, including without limitation, any one or more of the charging device 112, the converter 114, the power wires 164, the towing vehicle disconnect device 118, the towing vehicle interface 120, the towing vehicle connector 128, the connection cable 126, the towed vehicle connector 130, the towed vehicle interface 124, the towed vehicle disconnect device 134, the energy storage device 122, the SDMS 138, and/or any others connectors, cables, pins, circuitry, etc. of the power charging system 100 which carry the charging power. Accordingly, in one embodiment, the power charging system 100 is rated to transfer at least 1 kW of charging power from the charging device 112 to the energy storage device 122 for charging the energy storage device 122. In alternative embodiments, the power charging system 100 is rated to transfer at least 1.5 kW, or at least 2 kW, or at least 5 kW, or at least 7 kW of charging power from the charging device 112 to the energy storage device 122 for charging the energy storage device 122. In order to transfer at these high charging powers, the power charging system 100 may charge at higher voltages than the typical 12 V of most towing vehicle electric systems. Hence, in embodiments of the presently disclosed power charging system 100, the power charging system 100 provides charging power from the charging device 112 and/or converter 114 at about 24 V, or at about 36 V, or at about 48 V, or at least about 20V, or at least about 24 V, or at least about 48V. The term "about" with respect to the charging voltage means within plus or minus 10% of the stated voltage. The higher transfer charging power allows faster and more timely charging of larger energy storage devices 122. In various embodiments of the power charging system 100, the energy storage device 122 may have an energy storage capacity of at least 2 kW-hr, or at least 3.5 kW-hr, or at least 7 kW-hr or from 2 kW-hr to 50 kW-hr, or at least 50 kW-hr, or at least 75 kW-hr.

The operation and functionality of the power charging system 100 and its components will now be described. As described herein, the power charging system 100 can safely transfer high charging power from the charging device 112 on the towing vehicle 102 to the energy storage device on the towed vehicle 104. In order to safely transfer the high charging power, the power charging system 100 is configured to safely handle high charging power, and also to monitor various conditions and characteristics of the power charging system 100 and control the operation of the power charging system 100 based on conditions and characteristics to avoid unsafe conditions. More specifically, the power charging system 100 uses the communication system 140 and operational data from the various towing vehicle sensors 136, the towing vehicle computer 138, the charging device 112, the operator interfaces 146, the towed vehicle sensors 137, the SDMS 138, the energy storage device 122, and/or the sub-controller 133 to provide such operational data to the controller 132, and the controller 132 is configured to control the operation of the power charging system 100 based on such operational data to avoid unsafe operating conditions. As some examples, the controller 132 may be configured to power the towing vehicle interface 120 and towed vehicle interface 124 only when they are connected to each other such that the power charging system 100 avoids unsecured, exposed and dangerous high voltage and high current connectors. The controller 132 may also be configured to control the charging power delivered to the energy storage device 122 based on the conditions of the energy storage device 122, such as state of charge, specifications of the energy storage device (e.g., charging current limits, charging voltage limits, charging temperature constraints, etc.), faults conditions and warnings regarding the energy storage device 122.

Accordingly, in the starting state of the power charging system 100 with the towed vehicle 104 disconnected from the towing vehicle 102, and the vehicle parked and the vehicle motor not running, the towing vehicle interface 120 and the towed vehicle interface 124 are not powered (i.e., there is no charging power at the interface 120 and 124). This may be accomplished by the controller 132 detecting that the towing vehicle interface 120 is not connected to the towed vehicle interface 124 from signals from the signal wire 144v (i.e., the controller detecting that the controller 132 is not grounded via the signal wire 144v), the towing vehicle disconnect sensor 176, and/or the towed vehicle disconnect sensor 178. When detecting that the towing vehicle interface 120 is not connected to the towed vehicle interface 124, the controller 132 maintains the disconnect device 118 (assuming that the disconnect device 118 is normally open (disconnected state) and closes (connected state)) in the disconnected state which disconnects the connection between the charging device 112 and the towing vehicle interface 120. Similarly, the controller 132 (via the sub-controller 133), or the sub-controller 133, maintains the disconnect device 118 (assuming that the disconnect device 118 is normally open (disconnected state) and closes (connected state)) in the disconnected state which disconnects the connection between the energy storage device 122 and the towed vehicle interface 124. In this disconnected state of the power charging system 100, the towing vehicle interface 120 and towed vehicle interface 124 are safely unpowered. The controller 132 is programmed to only power the towing vehicle interface 120 and towed vehicle interface 124 when detecting that the towing vehicle interface 120 and towed vehicle interface 124 are connected, as described herein.

Prior to connecting the towing vehicle interface 120 and towed vehicle interface 124, the controller 132 and sub-controller 133 may actuate the safe state indicator 148, such as the light 160 on the towing vehicle interface 120, the light 162 on the towed vehicle interface 124, the light on the dashboard of the towed vehicle, a notification on the display device 152, and/or a notification on a software app on a portable computing device 154, that towing vehicle interface 120 and towed vehicle interface 124 are safely unpowered, and that it is safe to connect them, for example by using the connection cable 126.

The operator then connects the towing vehicle interface 120 and towed vehicle interface 124, either directly, or using the connection cable 126. The controller 132 detects that the towing vehicle interface 120 and towed vehicle interface 124 have been connected using from signals from the signal wire 144v (i.e., the controller detecting that the controller 132 is now grounded via the signal wire 144v), the towing vehicle disconnect sensor 176, and/or the towing vehicle disconnect sensor 176. Upon detecting that the towing vehicle interface 120 and towed vehicle interface 124 have been connected, the controller 132 can actuate the physical safety interlock 168 and the physical safety interlock 170 thereby locking the connection and preventing disconnection of the towing vehicle interface 120 from the towed vehicle interface 124 via the connection cable 126, if utilized, until the power charging system 100 is in a safe state for disconnection when both the towing vehicle interface 120 from the towed vehicle interface 124 have been de-powered. Alternatively, the controller 132 can actuate the physical safety interlock 168 and the physical safety interlock 170 only after the towing vehicle interface 120 and the towed vehicle interface 124 have been connected and powered with charging power, as described herein. Again, the controller locks the physical safety interlock 168 and the physical safety interlock 170, thereby locking the connection and prevents disconnection until the towing vehicle interface 120 from the towed vehicle interface 124 have been de-powered.

The controller 132 also receives operational data from the towing vehicle sensors 136, the towing vehicle computer 138, the charging device 112, the operator interfaces 146, the towed vehicle sensors 137, the SDMS 138, the energy storage device 122, and/or the sub-controller 133. The controller 132 then determines whether to provide charging power from the charging device 112 to the energy storage device 122 based on the operational data. For example, the controller 132 may determine to provide charging power from the charging device 112, under one or more of the following conditions based on the operational data:

1. The energy storage device 122 is not fully charged, and requires charging. This may be determined by the controller 132 based on receiving a "charge enabled" signal from the storage device charge requested signal device 137e via the signal wire 144t, and/or based on the contents of a received encoded battery state signal from the encoded storage device state signal device 137f via the signal wire 144 u, and/or based on receiving operational data regarding the operational status of the charging energy storage device from the SDMS 138 via the signal wire 144m, sub-controller 133 via the signal wire 142, and/or other components of the power charging system 100.

2. The energy storage device 122 is in condition for being charged. For example, the controller 132 may determine whether the energy storage device is at a proper temperature, non-fault condition, and/or other state for being safely charged. This may be determined by the controller 132 based on receiving operational data from: the towed vehicle sensors via the signal wires 144, the SDMS 138 via the signal wire 144m, the sub-controller 133 via the signal wire 142, and/or other components of the power charging system 100.

3. The charging device 112 is in condition to provide charging power to the energy storage device 122. For instance, the controller 132 may determine whether the vehicle motor is running and in a state (e.g., transmission in "drive," "park," or "neutral") so that it may power the charging device (e.g., an alternator powered by the vehicle motor), whether the charging device is in a fault state, etc. This may be determined by the controller based on receiving operational data from: the charging device 112 via signal wire 144d, the regulator via the signal wire 144c, the towing vehicle sensors 136 via the signal wires 144, and/or the towing vehicle computer 138 via signal wire 144e.

When the controller 132 determines that it is appropriate to charge the energy storage device 122, the controller 132 actuates the disconnect device 118 to connect the charging device 112 to the towing vehicle interface 120 and actuates the disconnect device 134 to connect the energy storage device 122 to the towed vehicle interface 124, thereby completing the closed "charging circuit" between the charging device 112 and the energy storage device 122. The controller 132 then activates the charging device 112 to transfer charging power from the charging device 112 to the energy storage device 122. The controller 132 can also control the charging device 112 and/or converter 114 to set the charging power output (e.g., the voltage and current output) by the charging device 112 and/or converter 114 to properly charge the energy storage device 122 based upon the operational data received by the controller 132. For instance, the controller 132 may control the regulator 116 to control the power output of the charging device 112 (e.g., an alternator) and/or the converter 114. In the case of self-actuating physical safety interlocks 168 and 170, upon powering the charging circuit, the physical safety interlock 168 and the physical safety interlock 170 automatically lock thereby locking the connection and preventing disconnection of the towing vehicle interface 120 from the towed vehicle interface 124 via the connection cable 126, if utilized, until the towing vehicle interface 120 from the towed vehicle interface 124 are de-powered. In addition, the controller 132 sets the safe state indicator(s) to indicate it is not safe to disconnect the towing vehicle interface 120, the towed vehicle interface 124 and/or the connection cable 126. For example, in the case of indicator lights 160 and 162, the controller 132 can turn out the lights when the charging circuit is powered to indicate it is not safe to disconnect, and turn on the lights when the charging circuit is de-powered to indicate it is safe to disconnect, or vice versa.

As the power charging system 100 charges the energy storage device 122, the controller 132 continues to monitor the operational data of the power charging system 100. For example, the controller 132 monitors the operational data to determine whether the energy storage device 122 is fully charged, as does the SDMS 138. If the controller 132 and/or SDMS 138 determines that the storage device 122 is fully charged, the controller 132 can discontinue transferring the charging power from the charging device 112 to the energy storage device 122. To discontinue the charging, the controller 132 may first gradually de-power the charging device 112, such as by reducing the power output of the charging device 112. This can protect the charging device 112 by avoiding rapid removal of the load on the charging device 112 which may damage the charging device 112 (e.g., damage to an alternator caused by rapidly removing the load). Next, the controller 132 may actuate the disconnect device 118 to disconnect the charging device 112 from the towing vehicle interface 120 and actuate the disconnect device 134 to disconnect the energy storage device 122 from the towed vehicle interface 124. This may be done as a safety precaution in case an operator decides to manually disconnect the towing vehicle interface 120 from the towed vehicle interface 124.

The controller 132 continues to monitor the operational data to determine whether to again provide charging power from the charging device 112 to the energy storage device 122 based on the operational data, in the same manner described above. For example, as the energy storage device 122 is used to power equipment on the towed vehicle 104, the energy storage device 122 may again require charging. When the controller 132 determines to again provide charging power from the charging device 112 to the energy storage device 122 based on the operational data, the controller performs the same charging process described above.

In order to disconnect the power charging system 100, such as when disconnecting the towed vehicle 104 from the towing vehicle 102, the controller 132 is configured to first de-power the charging circuit in order to avoid the danger having unsecured and open powered connectors when manually disconnecting the towed vehicle interface 120 from the towing vehicle interface 124 (e.g., by disconnecting the connection cable 126). The charging device 112 may also be disabled or shut down to avoid damaging the charging device 112 by rapidly removing the load on the charging device 112. The power charging system 100 may be configured in several ways to accomplish the safe shutdown and disconnection, in which the power charging system 100 may be configured to utilize any one or more of the shutdown/disconnect processes.

In one simple way, the power charging system 100 may utilize a manually initiated shutdown and disconnect procedure. The controller 132 is configured to receive a manually actuatable disconnect/shutdown input from an operator via any one of the operator interfaces 146, or even a separate user input device. Upon receiving the disconnect/shutdown input, the controller 132 may first power down the charging device 112 to prevent damage to the charging device 112. Next, the controller 132 actuates the disconnect device 118 to disconnect the charging device 112 from the towing vehicle interface 120 and actuates the disconnect device 134 to disconnect the energy storage device 122 from the towed vehicle interface 124, thereby safely de-powering the towing vehicle interface 120 and the towed vehicle interface 124. The controller 132 then de-actuates (i.e., unlocks) the physical safety interlocks 168 and 170, thereby unlocking the connection between the towing vehicle interface 120 and the towed vehicle interface 124 (including, if utilized, connection cable 126 from the towing vehicle interface 120 and the towed vehicle interface 124). If self-actuating, the physical safety interlocks 168 and 170 unlock upon de-powering the charging circuit. The controller 132 also actuates the safe state indicator(s) 148 showing an operator that it is now safe to disconnect the connection cable 126 from the towing vehicle interface 120 and the towed vehicle interface 124. The towed vehicle 104 may now be disconnected from the towing vehicle 102 by disconnecting the trailer coupler 110 from the trailer hitch 108.

In another manual disconnect/shutdown procedure, an operator may begin disconnecting the towed vehicle interface 120 from the towing vehicle interface 124. The controller 132 will detect that the towing vehicle disconnect sensor 176, and/or the towed vehicle disconnect sensor 178 are being disconnected prior to the high-power pins/contacts 172 of the towing vehicle interface 120 disconnecting from the mating high-power pins/contacts of the towing vehicle connector 128. The controller 132 then executes the same disconnect/shutdown procedure and the operator can disconnect the towed vehicle, as described above.

Another disconnect/shutdown procedure is more automated in that the controller 132 determines that the operator may be about to disconnect the towed vehicle interface 120 from the towing vehicle interface 124, without a manual input from the operator. In this case, the controller is configured to execute the disconnect/shutdown procedure based upon an operational characteristic of the towing vehicle 102. The controller 132 is receiving operational data from the towing vehicle sensors 136, the towing vehicle computer 138, the charging device 112 and the regulator 116. This operational data includes data representative of an operational characteristic of the towing vehicle 102. Accordingly, the controller 132 is configured and/or programmed to execute the disconnect/shutdown procedure describe above based upon an operational characteristic of the towing vehicle. For example, the operational characteristic of the towing vehicle may be that the towing vehicle is in park, or that the towing vehicle is in neutral, based upon operational data received from the transmission position sensor 136a via signal wire 144d. In addition, the operational characteristic of the towing vehicle may be that the towing vehicle parking break has been enabled, based upon operational data received from the parking break position sensor 136b via signal wire 144g. Also, the operational characteristic of the towing vehicle may be that the towing vehicle engine is turned off or is below a maximum speed, based upon operational data received from the engine RPM sensor 136d or 136e. The operational data representative of the operational characteristic may be received by the controller 132 from the towing vehicle computer 138 or by accessing a towing vehicle internal digital communications network.

Accordingly, an innovative and improved power charging system 100 has been disclosed. The power charging system 100 is capable of safely transferring high power levels, above 1 kW to 7 kW, from a charging device 112 on the towing vehicle 102 to an energy storage device 122 on the towed vehicle 104. The power charging system 100 is also configured to safely de-power components of the system to prevent hazardous conditions which can create a risk of accidental electrical shock and/or damage to the system components.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A power charging system for a towing vehicle and a towed vehicle connectable to the towing vehicle, the power charging system comprising:
   a charging device disposed on the towing vehicle, wherein the charging device includes an alternator;
   a towing vehicle interface disposed on the towing vehicle and in selectable electrical connection with the charging device;
   an energy storage device disposed on the towed vehicle;
   a towed vehicle interface disposed on the towed vehicle and in selectable electrical connection with the energy storage device, the towed vehicle interface configured to be electrically connected and disconnected with the towed vehicle interface; and
   a communication system configured to communicate operational data representative of operational conditions of the charging device and the energy storage device to a controller;
   wherein the controller is operably coupled to the charging device and configured to control operation of the alternator based upon the operational data;
   wherein the alternator of the charging device is configured to transfer charging power from the alternator to the energy storage device, and
   wherein the controller is configured to selectably de-power the towing vehicle interface based upon an operational characteristic of the towing vehicle, wherein the operational characteristic is one or more selected from the group of: the towing vehicle being in park; the towing vehicle being in neutral; the towing vehicle being at idle; a towing vehicle parking brake being enabled; a towing vehicle engine being turned off; and the towing vehicle being below a maximum speed.

2. The power charging system of claim 1, wherein the charging device further includes an alternator controller.

3. The power charging system of claim 1, wherein the alternator is a chassis alternator of the towing vehicle.

4. The power charging system of claim 1, wherein the alternator is dedicated to the power charging system and is not configured for powering or charging any towing vehicle equipment.

5. The power charging system of claim 1, wherein the charging device comprises a power conversion device.

6. The power charging system of claim 5, wherein the power conversion device is selected from a group consisting of a DC-DC converter, a DC-AC converter, an AC-DC converter, a pulse width modulation controller, a current limiting wire, and a current limiting self-resetting device.

7. The power charging system of claim 1, wherein the towed vehicle interface and the towing vehicle interface each comprises a single housing carrying both the charging power and operational data.

8. The power charging system of claim 7, wherein the towed vehicle interface and the towing vehicle interface each comprise high-power pins for carrying the charging power and separate auxiliary pins for carrying the operational data.

9. The power charging system of claim 1, wherein the towed vehicle interface and the towing vehicle interface each comprises a power housing for carrying the charging power, and a physically separate data housing for carrying at least some of the operational data and not carrying any of the charging power.

10. The power charging system of claim 9, wherein at least some of the operational data is not carried by the physically separate data housing.

11. The power charging system of claim 1, wherein the communication system is configured to communicate operational data using a digital communication protocol.

12. The power charging system of claim 11, wherein the communication system comprises a controller area network (CAN) having a CAN bus.

13. The power charging system of claim 11, wherein the communication system comprises one of an Ethernet network and a RS-485 network.

14. The power charging system of claim 1, wherein the communication system comprises a wireless communication protocol.

15. The power charging system of claim 14, wherein the wireless communication protocol is selected from a group consisting of WiFi, Bluetooth, wireless USB, Zigbee, and cellular phone protocol.

16. The power charging system of claim 1, wherein the communication system comprises one or more signal wires operably coupled to the controller.

17. The power charging system of claim 16, wherein the one or more signal wires comprise one or more analog sensing wires.

18. The power charging system of claim 17, wherein the one or more analog sensing wires include one or more of a battery voltage sensing wire, a battery temperature wire, a thermocouple wire, a battery current sensing wire, an energy storage device charge requested signal wire, and an encoded battery state signal wire.

19. The power charging system of claim 16, wherein the one or more signal wires are each selected from a group consisting of: a digital signal wire; a signal level wire; and an analog sensing wire.

20. The power charging system of claim 16, wherein the one or more signal wires comprise:
a connection present signal wire which indicates whether the towing vehicle interface and towed vehicle interface are connected;
an energy storage device charging status signal wire which indicates whether charging of the energy storage device is enabled, charging of the energy storage device is disabled, and charge state to be maintained in which the charging device supplies power to other loads in the towed vehicle and only provides power to the energy storage device to maintain a current state of charge.

21. The power charging system of claim 1, wherein the operational data includes a charging status of the energy storage device, including one of a charging enable status and a charging disabled status.

22. The power charging system of claim 21, wherein the energy storage device comprises a storage device management system (SDMS) and the charging status is determined by the SDMS and communicated from the SDMS to the controller.

23. The power charging system of claim 21, wherein the energy storage device comprises a storage device management system (SDMS) configured to communicate operational data regarding the energy storage device to the controller, and the charging status is determined by the controller based upon operational data obtained from the SDMS.

24. The power charging system of claim 21, wherein the charging status is determined by the controller based upon the operational data.

25. The power charging system of claim 21, wherein the charging status further includes charging needs of the energy storage device.

26. The power charging system of claim 25, wherein the operational data includes one or more present properties of the energy storage device, including at least one selected from a group of present state of temperature, state of charge, voltage, and amperage into or out of energy storage device.

27. The power charging system of claim 26, wherein the operational data further includes specifications of the energy storage device, present needs of the charging device and energy storage device, and warnings, alarms and faults of both the charging device and energy storage device.

28. The power charging system of claim 1, wherein the operational data includes an operational status of the charging device, specifications of the charging device, an operational status of the energy storage device, and specifications of the energy storage device, wherein:
the operational status of the charging device includes one or more properties of the charging device selected from a group of: current output; voltage output; temperature; overheating status; percentage utilization; operating mode, including standby, active, initializing, faulted state; identification of faults, including overheated, internal fault condition-logic error, energy storage device not communicating, lost communication, broken sensor, energy storage device fault; target energy storage voltage, target energy storage current;
the operational status of the energy storage device includes one or more properties of the energy storage device selected from a group of: present state of charge, present energy storage capacity; present voltage; present temperature; present current; charging mode, including charging enabled or charging disable; target energy storage voltage; target energy storage current; number of battery management systems (BMS's) present; whether the energy storage device is online; fault state; and state of health;
the specifications of the energy storage device include one or more selected from a group of: type of energy storage device; overall storage capacity of the energy storage device; charging current limits of the energy storage device; charging current limits of the BMS; charging voltage limits; charging temperature limits; and charging rate limits; and the specifications of the charging device include one or more of selected from a group of: output amperage capacity; output voltage; allowable operating temperature range; and power output capacity.

29. The power charging system of claim 1, wherein the controller is configured to selectably de-power the towing vehicle interface and the towed vehicle interface prior to disconnecting the towing vehicle interface from the towed vehicle interface.

30. The power charging system of claim 29, wherein the controller is configured to only power the towing vehicle interface and the towed vehicle interface when the towing vehicle interface is connected to the towed vehicle interface.

31. The power charging system of claim 29, wherein the controller is configured to selectably de-power the towing vehicle interface and the towed vehicle interface based upon a manually actuatable input by an operator.

32. The power charging system of claim 31, further comprising a safe state indicator which indicates when it is safe to disconnect the towing vehicle interface and the towed vehicle interface upon de-powering of the towing vehicle interface and the towed vehicle interface.

33. The power charging system of claim 32, wherein the safe state indicator is one of a light on one of the towing vehicle interface and/or the towed vehicle interface, a light on a dashboard of the towed vehicle, a notification on a display device, and a notification on a software app on a handheld computing device.

34. The power charging system of claim 29, wherein the controller is further configured to selectably de-power the towed vehicle interface based upon the operational characteristic of the towing vehicle.

35. The power charging system of claim 1, wherein the operational characteristic is determined by one or more of: accessing a towing vehicle internal digital communications network; use of switches indicating position of transmission of the towing vehicle; use of switches indicating position of parking brake mechanism of the towing vehicle; use of sensors to sense motion of the towing vehicle; use of sensors coupled to the charging device to indicate engine RPMs of the towing vehicle; and use of sensors to indicate RPM of engine or transmission of the towing vehicle.

36. The power charging system of claim 35, further comprising a safe state indicator which indicates when it is safe to disconnect the towing vehicle interface and the towed vehicle interface upon de-powering of the towing vehicle interface and the towed vehicle interface.

37. The power charging system of claim 36, wherein the safe state indicator is one of a light on one of towing vehicle interface and/or the towed vehicle interface, a light on a dashboard of the towed vehicle, a notification on a display device, and a notification on a software app on a handheld computing device.

38. The power charging system of claim 1, wherein at least one of the towing vehicle interface and the towed vehicle interface comprises a physical safety interlock which prevents disconnection of the towing vehicle interface and the towed vehicle interface until the power charging system and energy storage device are in a safe state for disconnection.

39. The power charging system of claim 38, wherein the physical safety interlock is operably coupled to, and controlled by the controller.

40. The power charging system of claim 1, wherein:
at least one of the towing vehicle interface and the towed vehicle interface comprises a disconnect sensor configured to detect that the towing vehicle interface and the towed vehicle are being disconnected;
the disconnect sensor operably coupled to the controller; and
the controller configured to de-power the towing vehicle interface and the towed vehicle interface upon detecting that the towing vehicle interface and the towed vehicle are being disconnected.

41. The power charging system of claim 40, wherein the towing vehicle interface, the towed vehicle interface and the disconnect sensor are configured such that the disconnect sensor detects that towing vehicle interface and the towed vehicle interface are being disconnected prior to a power connection between the towing vehicle interface and the towed vehicle interface carrying charging power from the charging device is disconnected.

42. The power charging system of claim 39, wherein the controller is configured to de-power the towing vehicle interface and the towed vehicle interface based upon a disconnect sensor detecting that the towing vehicle interface and the towed vehicle interface are being disconnected prior to de-powering the towing vehicle interface and the towed vehicle interface.

43. The power charging system of claim 1, further comprising a safe state indicator which indicates when it is safe to disconnect the towing vehicle interface and the towed vehicle interface upon de-powering of the towing vehicle interface and the towed vehicle interface.

44. The power charging system of claim 43, wherein the safe state indicator is one of a light on one of towing vehicle interface and/or the towed vehicle interface, a light on a dashboard of the towed vehicle, a notification on a display device, and a notification on a software app on a handheld computing device.

45. The power charging system of claim 1, further comprising a human user interface configured to communicate a status of the power charging system.

46. The power charging system of claim 45, wherein the human user interface is integrated with a fleet vehicle monitoring system.

47. The power charging system of claim 45, wherein the human user interface comprises one of: a dashboard display on the towing vehicle; one or more indicator lights; a graphical display device; an LCD display; an LED display; an OLED display; and a wireless communication module configured to communicate with a software application (app) on a handheld computing device.

48. The power charging system of claim 47, wherein the human user interface is integrated with a fleet vehicle monitoring system.

49. The power charging system of claim 48, wherein the human user interface is dedicated to the power charging system.

50. The power charging system of claim 1, wherein the power charging system is configured to transfer charging power of at least 1 kW from the charging device to the energy storage device.

51. The power charging system of claim 1, wherein the power charging system is configured to transfer charging power of at least 4 kW from the charging device to the energy storage device.

52. The power charging system of claim 1, wherein the power charging system is configured to transfer charging power of at least 5 kW from the charging device to the energy storage device.

53. The power charging system of claim 1, wherein the power charging system is configured to transfer charging power of at least 7 kW from the charging device to the energy storage device.

54. A method for charging an energy storage device on a towed vehicle, the method comprising:
obtaining operational data representative of operational conditions of an alternator of a charging device on a towing vehicle and an energy storage device on a towed vehicle;
controlling operation of the alternator based at least in part on the operational data;
transferring charging power from the alternator to the energy storage device; and
selectably de-powering the alternator based upon an operational characteristic of the towing vehicle, wherein the operational characteristic is one or more selected from the group of: the towing vehicle being in park; the towing vehicle being in neutral; the towing vehicle being at idle; a towing vehicle parking brake being enabled; a towing vehicle engine being turned off; and the towing vehicle being below a maximum speed.

55. The method of claim 54, wherein transferring charging power from the alternator to the energy storage device includes transferring charging power of at least 1 kW from the alternator to the energy storage device.

56. The method of claim 54, wherein transferring charging power from the alternator to the energy storage device does not include powering or charging any equipment of the towing vehicle.

57. The method of claim 54, further comprising converting power of the charging device using a power conversion device.

58. The method of claim 57, wherein the power conversion device is selected from a group consisting of a DC-DC converter, a DC-AC converter, an AC-DC converter, a pulse width modulation controller, a current limiting wire, and a current limiting self-resetting device.

59. The method of claim 54, further comprising communicating the obtained operational data using auxiliary pins which are separate from high power pins for carrying the transferred charging power.

60. The method of claim 54, comprising communicating the obtained operational data using a wireless communication protocol.

61. The method of claim 60, wherein the wireless communication protocol is selected from a group consisting of WiFi, Bluetooth, wireless USB, Zigbee, and cellular phone protocol.

62. The method of claim 54, further comprising providing an indication that the charging device and the energy storage device are electrically connected.

63. The method of claim 54, wherein the operational data includes a charging status of the energy storage device, including one of a charging enable status and a charging disabled status.

64. The method of claim 54, wherein the operational data includes one or more present properties of the energy storage device, including at least one selected from a group of present state of temperature, state of charge, voltage, and amperage into or out of the energy storage device.

65. The method of claim 54, further comprising determining the operational characteristic by one or more of: accessing a towing vehicle internal digital communications network; indicating a position of a transmission of the towing vehicle using switches; indicating a position of a parking brake mechanism of the towing vehicle using switches; sensing motion of the towing vehicle; sensing engine RPMs of the towing vehicle; and sensing RPM of an engine or transmission of the towing vehicle.

* * * * *